W. NEVINS.
Curing Sorghum.
No. 52,588.
Patented Feb. 13, 1866.
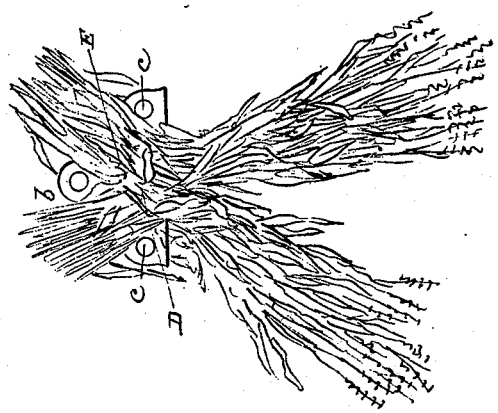
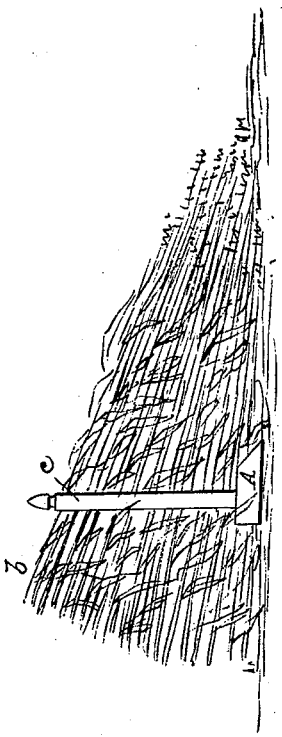
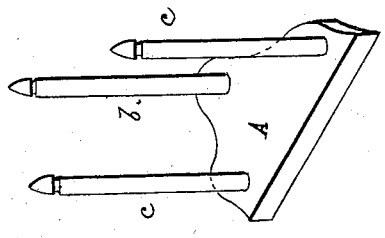
WITNESSES:
Jay Hyatt
Louis Guber
INVENTOR.
William Nevins
by J Maurice Attorney

UNITED STATES PATENT OFFICE.

WILLIAM NEVINS, OF LYONS, NEW YORK.

IMPROVEMENT IN CURING SORGHUM.

Specification forming part of Letters Patent No. 52,588, dated February 13, 1866.

*To all whom it may concern:*

Be it known that I, WILLIAM NEVINS, of Lyons, in the county of Wayne and State of New York, have invented a new and Improved Apparatus for Stacking and Curing Corn, Sorghum, &c.; and I do hereby declare that the following is a full and exact description thereof, reference being had to the accompanying drawings, in which—

Figure 1 is a view, in perspective, of my apparatus. Fig. 2 is a plan view, representing the same in use. Fig. 3 is a side elevation of a shock of corn stacked by my improved method.

Like letters of reference designate corresponding parts in all the figures.

In the common method of piling or stacking corn (maize) when cut, and previous to storing it in barns or under shelter, it is gathered in small quantities and set in shocks—that is, with the stalks upright and the butts resting on the ground, while the tops are bound together, forming a pyramidal stack. In this manner the sap or juice of the stalks is absorbed by the ground, with which the ends are in contact, by capillary attraction, and, in turn, the stalks absorb moisture from the ground, if it is wet, and this process deteriorates them for fodder and prevents its curing soon.

My improvement has for its object to prevent this deterioration by keeping the ends of the stalks from contact with the ground and exposing them to the influence of the sun and air, which soon closes the pores of the freshly-cut butts and prevents the loss of the saccharine matter contained in the juices.

To accomplish this I employ a piece of wood or frame, A, of convenient size for receiving three holes, arranged in the form of a triangle, as represented in the drawings, in which are inserted pins or standards *b c c*. These may be about two feet in height, and their distance apart may vary according to the size of the stalks in the crop to be harvested; but ten inches, or thereabout, is a suitable size for most purposes. One of these standards, *b*, may be permanently affixed to the frame A, but the others should be easily removable and the whole made light, so that it may easily be carried along, the pin *b* serving as a handle.

As the corn is cut the reaper lays on one or more stalks diagonally between two of the pins, *b c*, as at D, Fig. 2, and the next handful, as at E, so as to cross the former, and thus alternately crossing the stalks near the butt-ends until the frame is filled to the height of the pins *b c c*. The butts being the thickest portion, and all laid pointing to one side, (that of *b*,) they form the highest part of the pile and receive the sun and air, to which they are fully exposed, while the tops slope gradually down to the ground, so as to shed rain and spread, forming a bracing pile or stack which, being low, is not easily blown over.

When the pile is formed of sufficient height the loose pins *c c* are pulled out, which allows the frame A to be easily removed by the handle *b*. It is then placed in a position to receive the next pile, the pins *c c* are reinserted, and the process is repeated.

Care should be taken to lay the butts in the direction of the sun, if it be shining, or toward the wind, the object being to have the cut surface sear or dry up as soon as possible to close the pores, when there is no loss of the nutritious substance within the stalk, as the water only escapes by evaporation.

By forming the stacks or piles with the butts uppermost the ears hang down, so that the husks shed rain and keep the grain dry, which they do not do when the stalks are set in the usual manner with the tops uppermost, as the ears are then upright, and the husks are usually open at the upper end when ripe.

This method of curing is especially adapted to sorghum, which, from the thick and succulent nature of the stalks, contains much juice, and by this method all the saccharine matter is retained to be expressed in the mill, whereas much of it would be absorbed by the ground if left in contact with it.

The advantages of my method are: It promotes the drying of the stalks by evaporation, thereby retaining the nutritive juice, which renders the the grain more nutritious and the stalks more valuable for fodder. It prevents the absorption of moisture from the earth by the stalks or the juices from them by the earth when dry.

Corn stacked in this manner dries and cures more rapidly and sheds rain more effectually. It costs no more in time and labor than the usual process of shocking. In fact, it effects a saving, as the piles can be laid in the frame more rapidly than ordinary shocks can be set up and bound.

What I claim as my invention, and desire to secure by Letters Patent, is—

The described method of stacking corn, sorghum, &c., by means of the frame A $b$ $c$ $c$, substantially in the manner and for the purpose herein set forth.

In witness whereof I have hereunto signed my name in the presence of two subscribing witnesses.

WM. NEVINS.

Witnesses:
GEO. W. MIATT,
J. FRASER.